United States Patent [19]
Ruzic

[11] Patent Number: 5,181,490
[45] Date of Patent: Jan. 26, 1993

[54] ROTARY ENGINE

[76] Inventor: Ivan Ruzic, 5130 Portage Rd., Apt. 216, Niagara Falls, Ontario, Canada, L2E 6Z4

[21] Appl. No.: 699,665

[22] Filed: May 14, 1991

Related U.S. Application Data

[63] Continuation-in-part of Ser. No. 438,725, Nov. 17, 1989, abandoned.

[51] Int. Cl.$^5$ .............................................. F02B 53/00
[52] U.S. Cl. .................................... 123/243; 123/226; 418/92; 418/143; 418/255; 418/257
[58] Field of Search ................ 123/231, 243; 418/255; 385/184 R

[56] References Cited

U.S. PATENT DOCUMENTS

| | | | |
|---|---|---|---|
| 1,715,629 | 6/1929 | Shore | 418/255 X |
| 1,719,135 | 7/1929 | Roessler | 418/255 |
| 2,070,138 | 2/1937 | Martin | 123/243 X |
| 2,352,941 | 7/1944 | Curtis | 418/255 |
| 2,353,965 | 7/1944 | Meador | 418/255 |
| 3,139,722 | 7/1964 | Yokoi . | |
| 3,176,665 | 4/1965 | Macarrulla . | |
| 3,507,261 | 4/1970 | Myers et al. . | |
| 3,589,344 | 6/1971 | Steinke . | |
| 3,688,749 | 9/1972 | Wankel . | |
| 3,817,220 | 6/1974 | Brumm et al. . | |
| 3,886,908 | 6/1975 | Ruzic . | |

FOREIGN PATENT DOCUMENTS 974886 9/1975 Canada .
1011256 5/1977 Canada .

Primary Examiner—Michael Koczo
Attorney, Agent, or Firm—St. Onge Steward Johnston & Reens

[57] ABSTRACT

A rotary internal combustion engine including a housing dividing a substantially circular rotor chamber and a drive shaft extending through this chamber. A circular rotor is mounted in the chamber on the drive shaft and has a diameter less than the diameter of the chamber. The rotor and drive shaft are offset from the center axis of the chamber. Two pairs of vanes are slidingly mounted in the rotor with one vane of each pair being located diametrically opposite to the other vane of the pair. Rods fixedly connect the vanes of each pair together so that the predetermined distance between outer ends of the vanes of each pair remains constant and is the same for each pair. This predetermined distance is substantially equal to the distance from a point on the circumferential wall of the chamber which is closest to the circumference of the rotor and a second point on the wall diametrically opposite the first point. A portion of each of two circumferential wall sections is slightly removed to permit full rotation of the rotor.

17 Claims, 8 Drawing Sheets

ROTARY ENGINE

FIELD OF THE INVENTION

This application is a continuation-in-part of my co-pending U.S. patent application Ser. No. 07/438,725 filed Nov. 17, 1989, abandoned.

BACKGROUND OF THE INVENTION

This invention relates to rotary internal combustion engines which run on such fuels as diesel and gasoline The first rotary device was invented by Romelli in the late 16th century. This rotary unit had a circular rotor and mounted in the rotor were four vanes. When water was applied to one side of the rotor it started turning the unit. Since then rotary internal combustion engines have been developed and have met with some success. However many rotary internal combustion engines have not been successful commercially and even now such engines are not in wide use. In some of these engines, a close tolerance between the inner wall and the rotor edges had to be maintained or leakage of gases from one chamber to the next would occur resulting in poor performance.

In U.S. Pat. No. 3,176,665 issued Apr. 6, 1965 to L. Macarrulla there is disclosed a rotary internal combustion engine comprising a generally cylindrical stator or housing in which is rotatably mounted a rotor. The rotor is rotatably mounted by means of two opposed shaft sections that extend from opposite sides of the stator. Two pairs of vanes or blades are mounted in radially extending slots formed in the rotor at 90 degree intervals. Rods extend between the vanes of each pair, the ends of these rods being slidable in bores formed in the vanes. A seal or packing element is mounted in the outer end of each vane and is biased outwardly by a spring.

The present invention provides a rotary internal combustion engine which is relatively simple in its construction and reliable. The present engine has improved performance compared to known piston type engines and the use of the present engine can reduce the amount of resulting pollution compared to existing piston engines. The present invention can be constructed with a housing with a substantially circular rotor chamber. The housing is not difficult or expensive to manufacture and, although some machining of the interior surface of the housing is required, this can be readily accomplished with standard, known, milling machines.

Further with the use of the engine constructed in accordance with the invention, the outer ends of the vanes in the rotor closely follow the inner circumferential wall of the housing at all points during a revolution of the rotor. This is accomplished without undue or excessive wear between the outer end of each vane and the circumferential wall of the housing.

SUMMARY OF THE INVENTION

According to the invention, a rotary internal combustion engine includes a housing defining a substantially circular rotor chamber therein, this chamber having a circumferential wall, a drive shaft extending into the chamber, and a circular rotor in the chamber mounted on the drive shaft to rotate therewith. The rotor has a diameter less than the diameter of the chamber. The rotor and drive shaft are offset from the center axis of the chamber There is inlet means for introducing air and fuel into the chamber, which means extend through the housing and open into the chamber. An outlet for exhaust gases extends through the housing and is in fluid communication with the chamber There are at least two pairs of vanes slidingly mounted in the rotor with one vane of each pair being located diametrically opposite to the other vane of the pair. There are also means for fixedly connecting the vanes of each pair together so that a predetermined total distance between outer ends of the vanes of each pair remains constant and the same for each pair of vanes. This predetermined distance is substantially equal to the distance from a specific point on the circumferential wall of the chamber which is closest to the circumferential periphery of the rotor and a second point on the wall of the chamber diametrically opposite this specific point. These connecting means comprise two rods extending between the vanes of each pair and through the drive shaft. The rods are slidable in the drive shaft and are guided by two separate rings mounted on the drive shaft. These rings permit thermal expansion and contraction of the vanes. Furthermore, a portion of each of two circumferential wall sections of the housing is slightly removed from an initial, internal wall section, that is cylindrical, to permit full rotation of the rotor and vanes in the chamber.

Preferably the outer ends of the vanes include two apex seals which are spaced sufficiently to traverse any ignition spark plug hole found in a gasoline version of the present engine.

The vanes are mounted for retraction and extension within the rotor during rotation thereof. The retraction of one vane of the pair is equal to the extension of the other vane of the pair and conversely an extension of the first vane of the pair is equal to the retraction of the other vane.

The amount of the offset of the rotor in the chamber will vary depending upon the size of the engine. In one preferred embodiment having a 15" diameter chamber, there is a 13" diameter rotor mounted therein and its offset is 1". The applicant has found that when a perfectly round rotor is offset in this manner in a perfectly circular chamber, because of the difference in circumference of the rotor and the inner circumferential wall of the housing, the distance between the vane tips of a pair of diametrically opposed vanes mounted in the rotor must be capable of changing during a revolution of the rotor in order to permit the rotor to rotate. In other words, it is not possible to fix the distance between the outer ends of the opposed vanes of this construction. This is the difficulty which has confronted rotary engine builders for many years when they wish to offset the rotor in its chamber. In order to get around this problem, one has generally found it necessary to allow for greater tolerances between the outer ends of the vanes and the inner housing wall. The present inventor has found that this problem can be overcome in a simple and efficient manner while still providing an engine that is efficient, smooth running and constructed according to small tolerances The solution to the aforementioned problem is found in the making of slight changes to the contour of the inner wall of the housing, these changes permitting the opposing vanes to be fixedly connected together.

In order to obtain the correct contour for the inner wall of the housing, one begins at a point in the center of the rotor chamber, draws a straight line from that point in the direction of the offset of the rotor, through the axis of the rotor and continues onward to the chamber wall, and finds a point which can be termed top dead center or 0 degrees or point A while one places a point on the chamber wall directly opposite point A, which point can be considered the 180 degrees point or point C. If one then mounts in the rotor a pair of diametrically opposed vanes having a distance between their tips or outer ends equal to that of the diameter of a perfectly round chamber, and rotates the rotor such that the tips of the vanes are at points 0 degrees and 180 degrees, the vane tips will have a perfect matching relationship with the inner wall of the housing. For example this would occur at a perfectly round housing of 15" with a perfectly round rotor of 13" having an offset of exactly 1".

However because of the differences in circumference of the rotor and that of the inner wall of the housing, when the rotor with the pair of vanes aforementioned is turned 90 degrees such that the tips of the vanes are at points B and D on the chamber wall, the vane tips will not pass these points as the combined total length of the vanes is longer than the distance between points B and D on the housing wall. The difference in the distance between points A and C and between points B and D is approximately 4 millimetres in an engine with a 15" chamber and a 13" rotor mountably offset 1".

In the past this difficulty has been overcome by sacrificing efficiency and shortening the distance between the outer ends of the vanes, thus permitting the rotor to rotate freely. Another solution that has been proposed in the past is to spring load the vanes within the rotor, but this again reduces the efficiency of the engine. The present invention permits close tolerances between the outer ends of the vanes and the inner wall of the housing to be maintained at all points during a revolution of the engine. Full rotation of the rotor is allowed by machining inwardly sections of the inner wall, these sections extending through points B and D. The machining of the inner wall begins at a point approximately 22.5 degrees clockwise from point A reaching a maximum depth at point B then gradually decreasing to a point 67.5 degrees clockwise along the chamber wall from point B. A second machining cut begins at 22.5 degrees clockwise of point C (or 45 degrees from the termination of the first machine cut) and reaches its maximum depth at point D thereafter decreasing in depth for an additional 67.5 degrees past point D to a point 22.5 degrees clockwise from point A. By machining the inner wall of the housing in this manner one does not sacrifice any loss of efficiency. This also eliminates any need for the vanes to be mounted independently of one another or the vanes to be biased outwardly by means of springs.

The engine of the present invention uses a rotor with at least two pairs of vanes with the tip or outer end of one member of each pair being 180 degrees from the other member when assembled in the rotor. The members of each pair are fixedly connected to each other by one or more rods or, in some versions, by a cube structure. In a preferred embodiment the two members of each pair are connected to each other by two rods which pass directly through the center of the shaft of the rotor and are perpendicular thereto. These rods are maintained in position with respect to the shaft and are slidable therein by means of metal rings that extend around the shaft. As the engine revolves, the retraction of one of the members of each pair of vanes within the rotor results in a proportional extension of the other member of the pair from the rotor.

Because the inner wall of the housing is substantially cylindrical and there are no protuberances or substantial irregularities along the inner wall as in some prior art engines, it is possible to use two or more apex seals on the outer ends of the vanes. In some prior art gasoline engines of the rotary type, the use of a single apex seal cause difficulties when the outer end of the vane passed over the spark plug hole. Because the apex seal was narrower than the width of the hole, gases in the engine were able to pass from one chamber to another. With two or three apex seals provided in the outer end of each vane as described herein, this problem is eliminated and the loss of gases from cycle to cycle is decreased.

With the engine of the present invention constructed with two pairs of vanes, there are an ignition stage, a power stage, an exhaust stage and a compression stage during each revolution of the shaft. Because there are four vanes in the motor, it will be appreciated that there are four compressions, four ignitions, four power strokes and four exhaust strokes that take place during each revolution of the motor.

In the preferred embodiment of the present invention as described herein, the problem of exhaust gases mixing with fresh air inflow which exists in some prior art engines is significantly reduced by using a rotary compressor in the intake for fresh air and providing fresh air at 1.7 atmospheric pressure. The use of the compressor in this manner aids in the cleanliness of the engine. As one vane passes clockwise by the air intake and commences the compression stroke, the compressor air continues to fill the chamber on the opposite side of the vane in the area of the exhaust stage thereby forcing out the exhaust and helping to clean the engine. In one embodiment the pressurized incoming air from the compressor passes through the circumferential wall of the housing into the rotor chamber. In the alternative, this air can enter through the rear and front covers of the engine into the chamber if desired. This incoming air can be used to cool the vanes. It is to be noted that if the air inflow enters from opposite sides of the housing through the front and rear covers, it will generally enter at a position where the approaching vane extends outwardly its maximum distance from the rotor and is therefore exposed for maximum cooling effect from the air.

The engine of the present invention can be cooled in the usual manner using water or coolant that is circulated through a radiator system. In a preferred version of the engine, optimum cooling thereof is achieved by having the cooling water or coolant enter the engine housing adjacent the areas of the engine where the expansion and exhaust stages take place while the heated water leaves the engine adjacent the compression and ignition areas. This arrangement helps to effect even cooling and minimizes deformation of the housing.

In one preferred version of the engine described herein, special pistons are used to avoid a rough ignition cycle in the engine, this being a problem which has occurred in earlier rotary engines principally because of the small dimension of the firing chamber. The special pistons described herein are situated around the circumference of the rotor with one piston being located between two adjacent vanes. Each piston is moved inwardly and outwardly within the rotor by means of a crank shaft connected to a planetary gear which moves about a stationary gear mounted on the front cover of the engine. Each crank shaft is connected to its planetary gear in an offset manner such that during each ignition stroke of the engine, the adjacent piston moves inwardly and thereby enhances the clockwise rotation of the engine. The pistons are moved in a one to two ratio such that each piston moves inwardly and outwardly in the rotor two times for each revolution of the engine. The pistons are arranged such that they are in an extended position during ignition and during exhaust and in a retracted position during air intake and expansion stages. The use of such pistons is desirable in larger engines, for example those designed to provide over 200 horsepower. Such pistons are not necessary in smaller engines constructed in accordance with the invention.

The lubrication of the shaft and vane can be accomplished with a standard oil pump that circulates lubricating oil inwardly through the front portion of the shaft of the engine. As described hereinafter, this oil can move up to each vane through a passageway in one of the connecting rods that connects each pair of vanes together. After passing through the head of the vane, the remaining oil can return to the main shaft through the other rod. All of this oil eventually drains back to the oil pan.

Further modifications, improvements and features will become apparent for the following detailed description, taken in conjunction with the accompanying drawings.

DETAILED DESCRIPTION OF PREFERRED EMBODIMENTS

Figure 1:
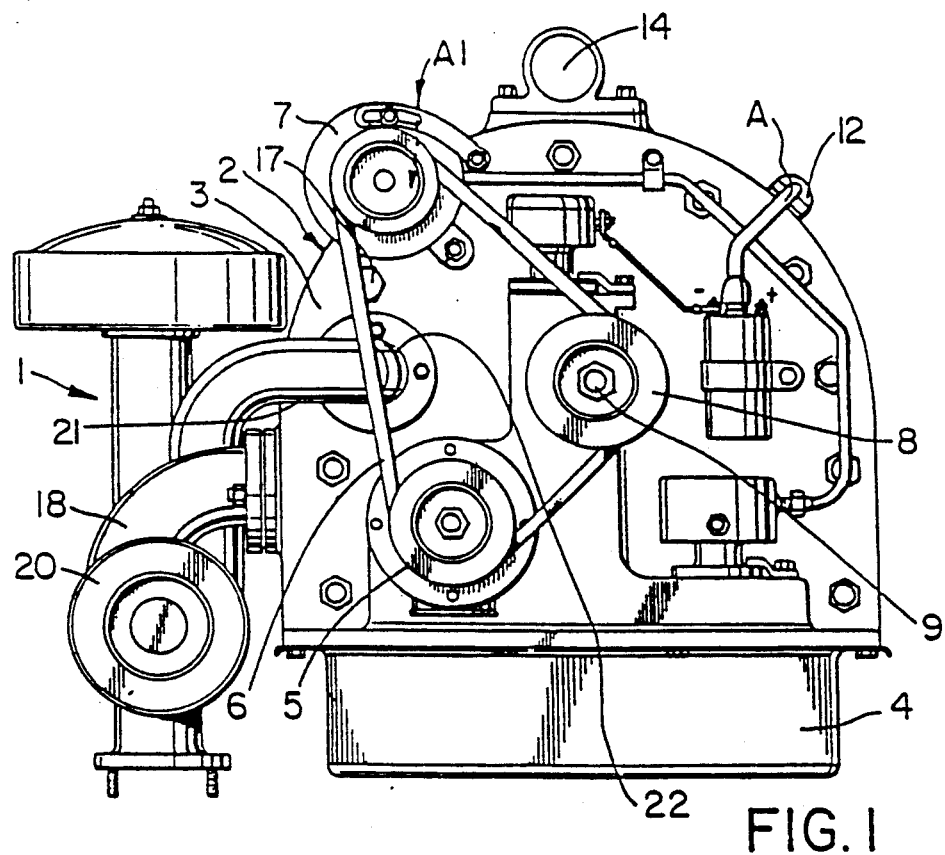
FIG. 1 is a front view of a rotary engine constructed in accordance with the invention.

In FIG. 1 there is shown a rotary engine 1 which includes a housing 2 having a front cover 3, an oil pan 4 located at the bottom of the housing, and a standard water pump 5 connected by an endless belt 6 to an alternator 7. The belt 6 extends around a central pulley 8 attached to a main shaft 9 of the engine. The engine has a single spark plug 12 at a position called top dead center A.

In order to cool the engine, coolant from a standard radiator circulates through the hollow walls of the housing 2 and leaves through an outlet 14 at the top of the engine. In a preferred embodiment of the invention, a fuel injection device of known construction (not shown) injects fuel into the engine approximately at location A1. The front cover 3 is bolted to the main body of the housing by means of bolts 17. The bolts are threaded into holes 51 centrally located in the housing wall (see FIG. 4). Exhaust gases leave the rotor chamber through an exhaust outlet to which exhaust pipe 18 is connected.

Figure 2:
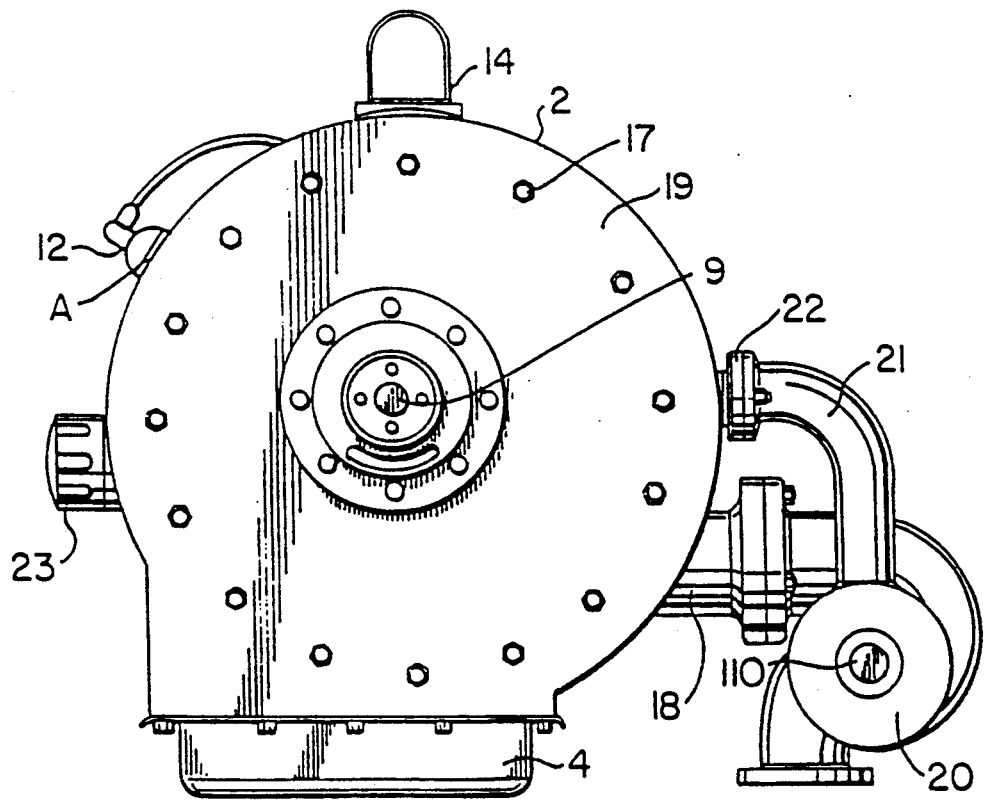
FIG. 2 is a rear view of the same engine with some components removed or omitted for sake of clarity.

As shown in FIG. 2, a rear cover 19 is detachably connected to the main body of the housing 2 by means of further bolts 17. The exhaust gases from the engine are used to drive a rotary gas compressor 20 which supercharges or forces pressurized air through an air intake pipe 21 and through intake opening 22 to the rotor chamber. Air enters the compressor 20 through an opening at 110 in its side. A conventional oil filter 23 can be attached to the housing on the side opposite the exhaust outlet.

Figure 3:
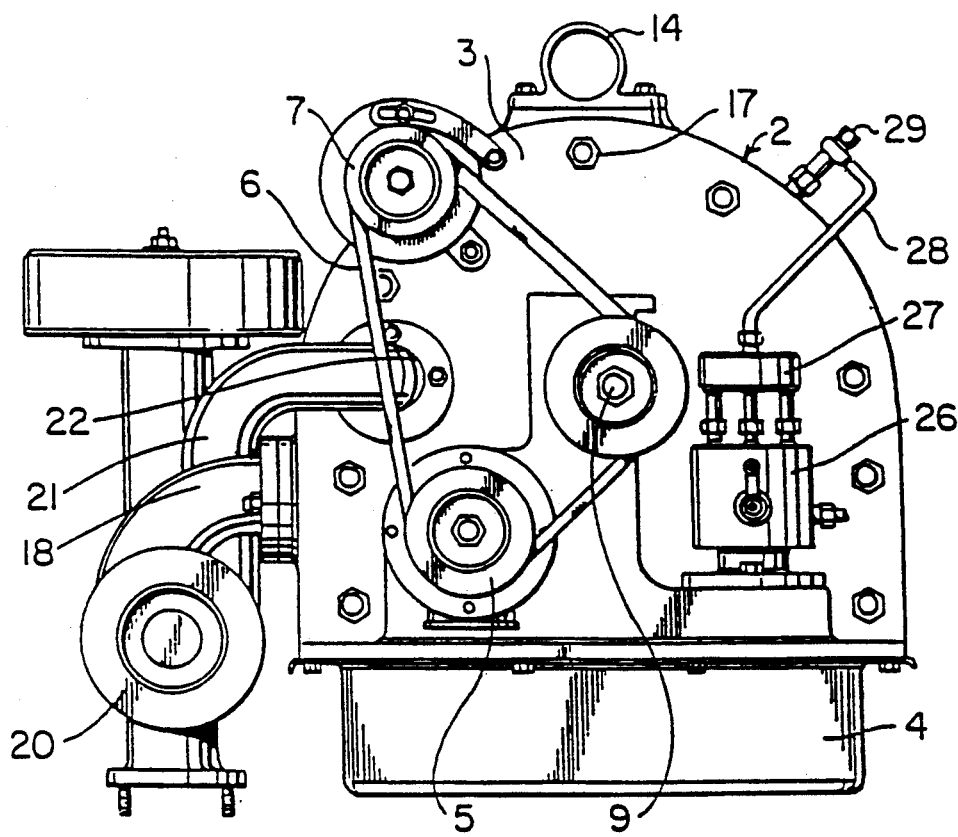
FIG. 3 is a front view of a diesel engine constructed in accordance with the invention.

FIG. 3 illustrates a diesel version of an engine constructed in accordance with the invention. It is similar in appearance to the gasoline version with the exception that diesel fuel moves from a standard diesel filter (not shown) to a standard four cylinder diesel fuel injection pump 26 having a distributor block 27 which carries fuel through a lead pipe 28 to a standard diesel injector 29 mounted on the circumferential wall of the housing.

Figure 4:
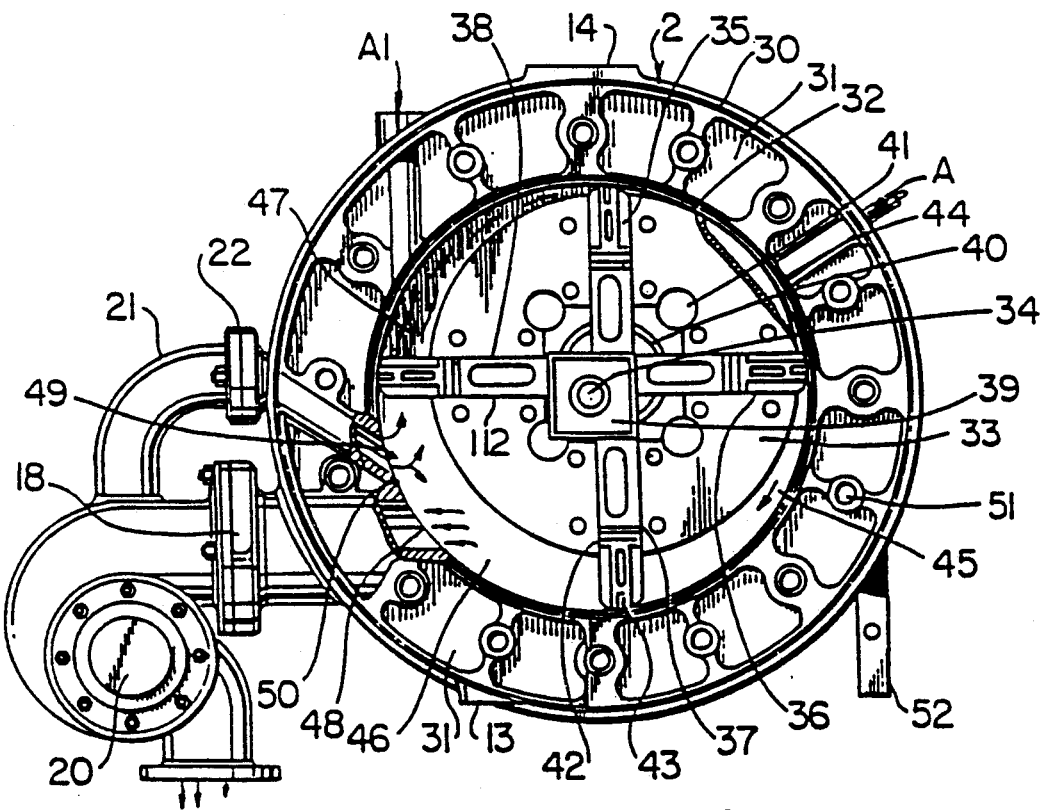
FIG. 4 is a front view of an engine employing a vane/cube system in the rotor, the engine being shown with its front cover removed and a front side plate of the rotor removed to shown the internal construction of the housing and the rotor.

FIG. 4 illustrates one version of a gasoline rotary engine constructed in accordance with the invention. This version is less expensive to construct than the alternate version described hereinafter. The front cover of the engine has been removed in FIG. 4 as has a side plate of the rotor in order to illustrate the vanes and the manner in which they are moved in the rotor. The housing 2 has an outer wall 30, inner hollow cooling chambers 31 through which coolant is circulated in the usual manner and an inner wall 32 which defines the circumference of a rotor chamber. In order to ignite a compressed combustible mixture in the rotor chamber, a spark is provided by a spark plug at position A. Gasoline is injected into the rotor chamber at the inner end of the passageway marked A1. A bearing 40 for supporting the rotor shaft is shown in FIG. 4. Lubrication drainage holes 41 are also located about the central shaft. A rotor 33 is mounted within the chamber so that its center axis is offset from the center axis of the chamber as shown. Slidingly mounted in the rotor are four vanes indicated at 35, 36, 37 and 38. There are in effect two pairs of vanes with the vanes in each pair being diametrically opposed. The opposing vanes 35 and 37 are so connected that they move inwardly and outwardly from the rotor in a proportional and opposite manner. Similarly opposing vanes 36 and 38 move in and out of the rotor in a proportional and opposite manner.

The engine of FIG. 4 is cooled by water or coolant entering through a suitable opening or openings in the front cover (not shown), circulating through the aforementioned chambers 31 and, after absorbing heat from the engine, leaving through an outlet 14 in the top of the housing. Also shown in FIG. 4 is a small housing extension at 13 which forms a flat surface to which the oil pan 4 can be attached using bolts. The support bar 52 is also used to connect the oil pan 4 on its side of the engine.

In the version of FIG. 4, two rotatable cubes or square blocks 39 (only one being shown) are positioned at the inner ends of the vanes 35 to 38. These spaced apart cubes, which do not move horizontally or vertically with respect to the engine housing, rotate on suitable bearings and fixedly connect the opposing vanes together so that they move outwardly and inwardly in the rotor. As illustrated in FIG. 4, the vanes 37 and 38 are in outward or advanced positions and the vanes 35 and 36 are in retracted positions. Each of these vanes has two legs 112, only one of which is shown in FIG. 4 with each leg connected to a respective cube or block 39. It will be understood that there is one cube 39 located on the front side of the rotor and another cube located on the rear side and these cubes synchronize the movement of the vanes. Located between the two cubes 39 is a central bearing which supports the rotor shaft. Also as shown in FIG. 4 each of the vanes is equipped with at least one circumferential seal 42 and at least one apex seal 43 mounted in its outer end or tip.

The four vanes separate four moving chambers or four stages which are found within the rotor chamber. The ignition stage occurs at 44 between vanes 35 and 36 while the expansion or power stage is at 45. The exhaust stage is located in the area between vanes 37 and 38 while the compression stage where fresh air and injected gasoline are mixed and compressed is at 47 in FIG. 4. During one complete revolution of the rotor there are four ignition stages, four power stages, four exhaust stages and four compression stages.

The exhaust or burnt gases exit the rotor chamber through an outlet 48 in the inner wall of the housing and fresh air, preferably under high pressure as described earlier, enters continuously through an opening 49 in the inner wall of the housing. As one can see from FIG. 4, fresh air under pressure is being pushed into the chamber 46 even as exhaust air is still being pushed out of the area 46. By introducing the fresh air in this manner, the amount of exhaust air that remains in the chamber during the compression stag (that is the stage 47 in FIG. 4) is substantially reduced. The constant introduction of fresh pressurized air during at least a substantial portion of the exhaust cycle helps to maintain the rotor chamber in a clean state.

As also shown in FIG. 4, before the vane 38 reaches the position shown in this figure, fresh air was being introduced only into the compression area but once the vane 38 passes the point 50 fresh air enters to exhaust area. This fresh air will stop entering the exhaust area once the vane 37 which is moving is a clockwise direction reaches approximately the point 50.

Figure 5:
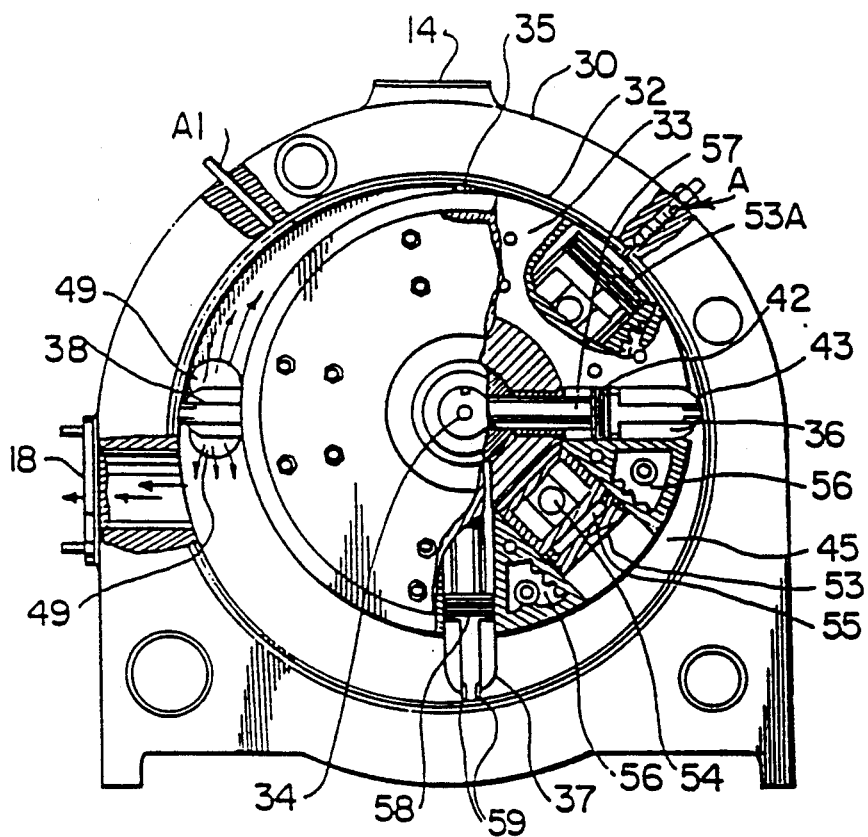
FIG. 5 is a front view of another embodiment of the invention, again with the front cover removed and with portions of the rotor cut away to show various details of the rotor.
Figure 6:
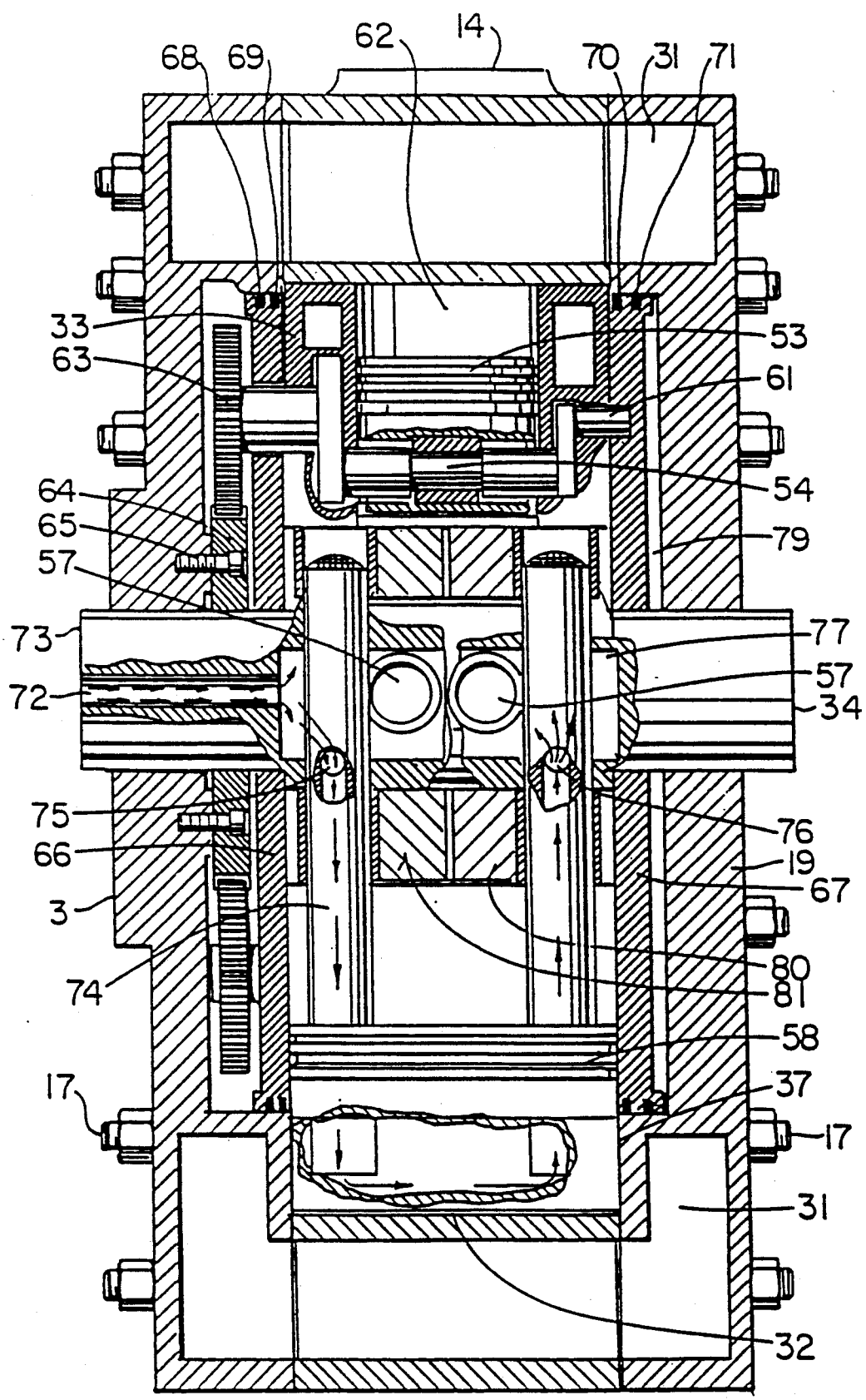
FIG. 6 is a cross-sectional view of the engine of FIG. 5 with a portion of the illustrated vane cut away to illustrate the circulation of the oil therethrough.

FIGS. 5 and 6 of the drawings illustrate the optional feature of four pistons 53 mounted in the rotor of the engine. These pistons can be used in larger engines, for example engines with an output in excess of 200 horsepower, in order to assist rotation of the rotor and to permit expansion of the adjacent section of the chamber in the ignition phase, thereby reducing engine roughness which is encountered in some prior art rotary engines. As explained hereinafter the pistons 43 are connected to planetary gears so that they will move in a two to one ratio, that is, for each revolution of the engine shaft (the mid-point of which is shown at 34) each piston moves through two complete cycles. Preferably the piston head has a cooling space 55 and further cooling is accomplished through cooling cavities 56 located within the rotor itself. In a rotary engine having four vanes there are four pistons each located centrally between a pair of adjacent vanes. The piston shown at 53A located at the ignition position is in the extended position close to the housing wall 32 while the lower right piston shown in FIG. 5 is in the retracted position which is the position during the expansion cycle 45. The piston (not shown) in the exhaust stage is in the extended position and the piston in the compression stage is in retracted position.

The pistons 53 are moved up and down by means of crank shafts 54, one of which is shown in FIG. 6. One end of each crank shaft is attached to a planetary gear 63 which moves about a stationary gear 64 having a circumference that is two times the circumference of each planetary gear. The stationary gear 64 is fixedly mounted on the inside of the front cover 3 of the engine by means of bolts 65. The planetary gears and pistons 53 are so arranged in the rotor that when ignition takes place, the adjacent extended piston will start to retract into the rotor and this will assist the rotor to rotate in the clockwise direction.

Another preferred feature shown in FIG. 5 of the drawings is the use of two apex seals 59 in the outer end or tip of each vane. The use of two spaced apart seals in this manner decreases the exchange of gases between adjacent chambers. Preferably the two apex seals are spaced far enough apart that they will bridge the gap of the spark hole and thus will not permit the passage of gases at this point.

Figure 7:
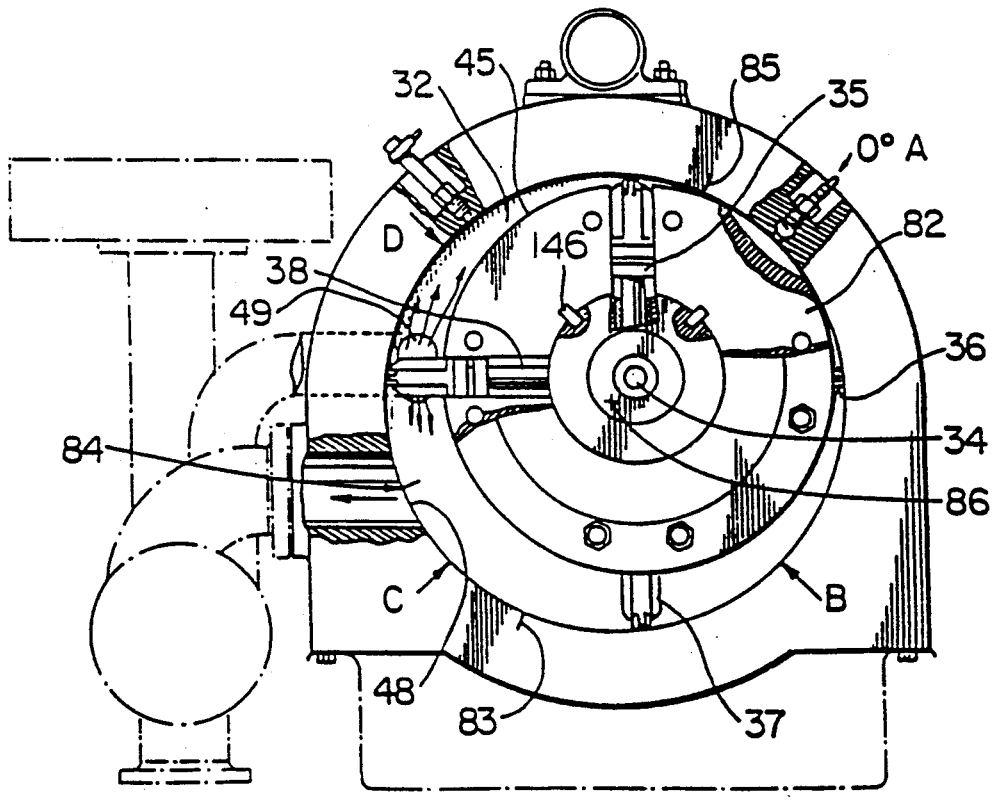
FIG. 7 is a front view of a further embodiment of a gasoline version of the engine with the front cover removed and a portion of the front side cover of the rotor cut away to illustrate the vanes.
Figure 16:
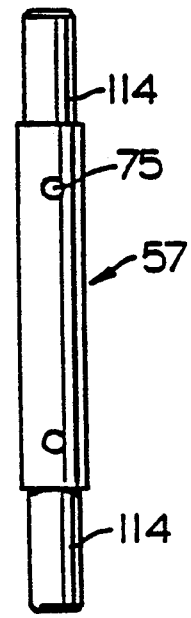
FIG. 16 is a side view of one of the rods used to connect a pair of vanes together.
Figure 17:
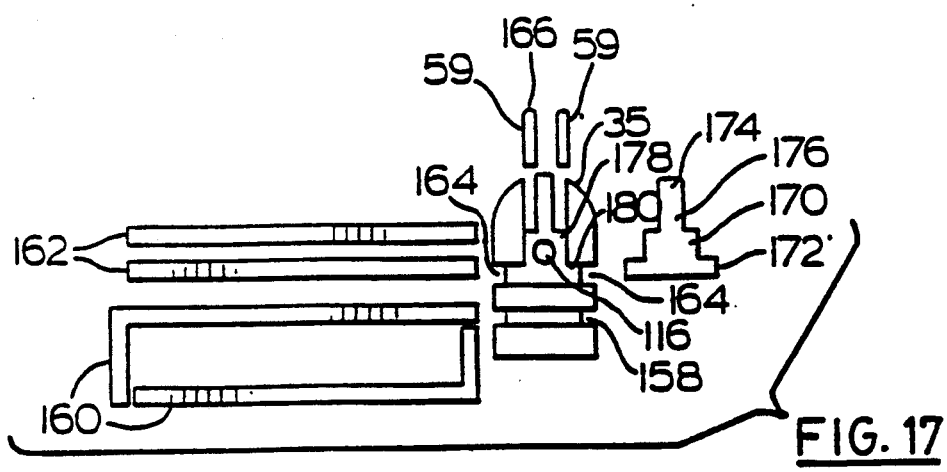
FIG. 17 is a side view of one of the vanes showing the various seals for the vane separated therefrom.

FIGS. 5 to 7 illustrate the preferred means for fixedly connecting the vanes of each pair together so that a predetermined total distance between outer ends of the vanes of each pair remains constant and same for each pair of vanes. Opposing vanes 36 and 38 are fixedly attached to each other by means of at least one and preferably two rods 57 extending between them. These rods pass through the center portion of the main shaft 9. They are mounted for sliding movement through the shaft by means of two rings 80 and 81 illustrated in cross-section in FIG. 6. These rings are prevented from rotating on the shaft by means of keyways formed in the shaft and rings and keys inserted therein. Opposing vanes 35 and 37 are also directly connected to one another by means of two rods 74 which pass through the main shaft at a 90 degree angle to the other pair of rods. An individual rod 57 is illustrated in FIG. 16. Each end of the rod 57 has an end section 114 of reduced diameter and the end section 114 fits snugly in a hole formed in the vane. Preferably a hole(s) 116 is drilled through the vane and this hole intercepts the two holes for the rods 57. Tightly received in this hole are two pins 118 which also extend through holes formed in the ends of the rods and these pins effectively prevent any movement between the rod ends and the vane. As explained previously, an inward movement of one vane of the pair will result in a proportionate movement outwardly of the opposing vane and vice versa.

FIGS. 5 and 7 also illustrate an alternative construction for the input for fresh air into the rotor chamber under pressure. In the embodiments of FIGS. 5 and 7 the fresh air enters through inlets 49 located in both the rear and front covers of the housing rather than in the circumferential wall of the housing as shown in FIG. 4. Air inlets 49 can be so located and arranged that air enters both the compression stage and the exhaust stage at the same time, if desired. As indicated previously, this fresh incoming air helps to cool the vanes.

Turning again to FIG. 6 of the drawings, it will be noted that the end of the crank shaft opposite planetary gear 63 is mounted within a bearing 61. Mounted to the front of the rotor 33 is a front rotor cover 66 comprising a circular plate with a central opening for the shaft. On the rear side of the rotor 33 is a rear rotor cover 67 which is spaced slightly from rear cover 19 of the housing. Extending completely around the two rotor covers 66 and 67 are circumferential seals 68, 69, 70 and 71. It should be noted that a circular recess 79 is formed in the rear housing cover 19 to accommodate the rear rotor cover and its diameter corresponds closely to that of the rear rotor cover. The seals 70 and 71 provide an efficient seal between rear cover 67 and the circumferential wall or shoulder formed by the recess 79. A similar but deeper recess is formed in the front cover 3 to accommodate not only the front rotor cover 66 but also the described gearing in the case of an engine having pistons.

FIG. 6 also illustrates a system for lubricating and cooling the vanes and adjacent parts. Lubricating and cooling oil enters through a central opening 72 in the front portion 73 of the shaft. This oil flows to the central area of the rotor where it passes through the horizontally extending left connecting rod 57 and vertically extending left connecting rod 74. The oil enters through a hole 75 in each rod and passes through a lengthwise extending passageway to the respective vane. Thereafter this oil circulates through the head of the vane before passing back to the main shaft through the right hand rod. The oil enters back into the main shaft through a hole 76 in the rod. The oil passes from the central space 77 in the shaft through a passageway (not shown) into the recess 79 in order to cool the space between the rear cover of the rotor and the rear of the housing. The cooling oil can pass out of the recess 79 through an opening (not shown) into the oil pan.

The aforementioned seals 68 to 71 are important to the overall efficiency of the rotary engine. In a preferred embodiment a wavy ring-shaped spring (not shown) urges the members of each pair of seals apart in order to produce proper sealing.

The pairs of rods 57, 74 which connect the vanes are held in place and supported by the aforementioned rings 80, 81 in which the rods slide. Because of the heating which occurs during operation of the engine, it is necessary to accommodate expansion of the metal components including the vanes. The use of two rings in the illustrated manner allows for sideways expansion of the vanes but maintains the rods in proper alignment.

Figure 12:
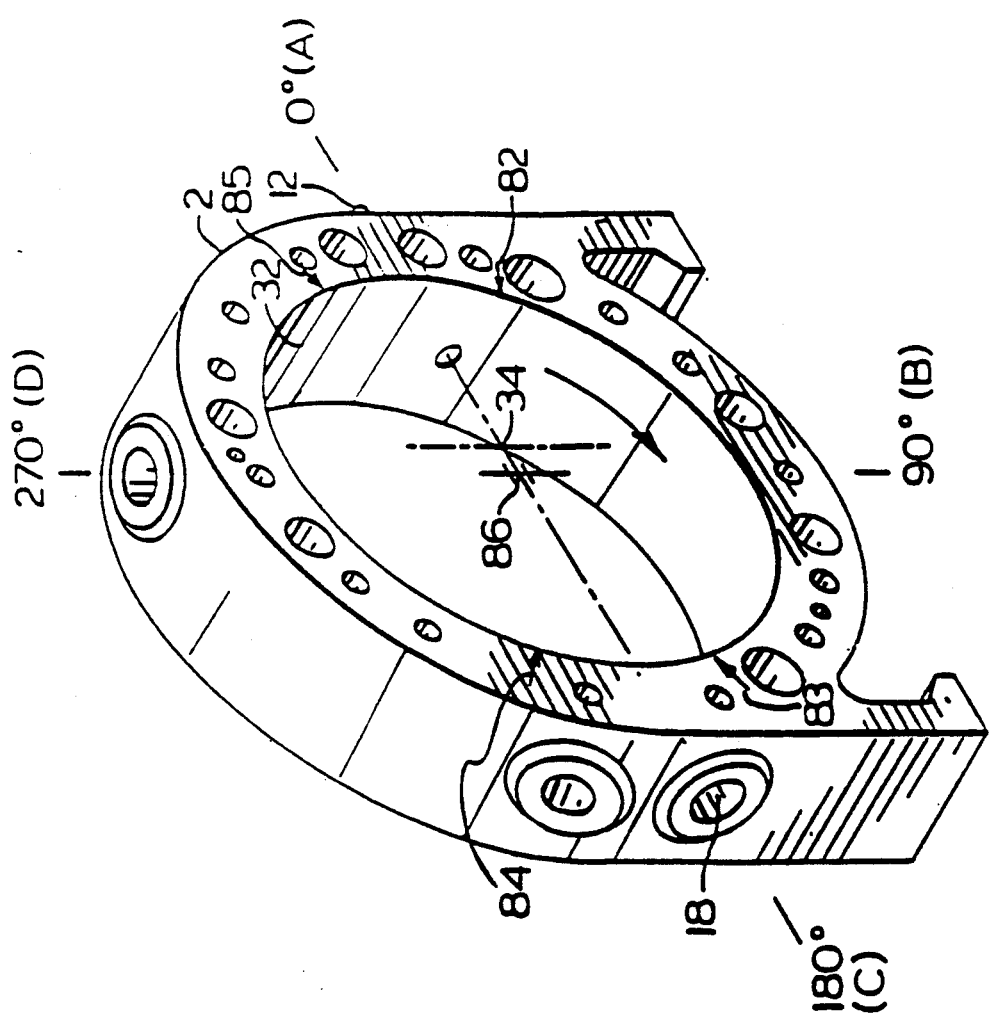
FIG. 12 is schematic perspective of the engine housing with the front cover removed, this view showing how the inner wall of the housing is shaped.

FIGS. 7 and 12 illustrate how the circumferential contour of the inner wall of the housing is altered to permit the vanes and the rotor to rotate through a complete revolution in the rotor chamber. If one draws a line from the center of the rotor chamber 86 straight towards the center of the rotor at 34 and continues on to the wall of the chamber one arrives at point A or 0 degrees, the point where the rotor is closest to the chamber wall. For example in a 15" diameter housing with a 13" rotor, the distance between 86 and 34 would be 1". Also the distance between A and a point C diametrically opposite thereto is about 15 inches within a tolerance of 3/1000 inch. Therefore a pair of diametrically opposed vanes having a predetermined total distance between their outer ends of 15 inches plus or minus three one thousandth of an inch will fit in the rotor chamber when the vanes are aligned between points A and C. However when the rotor turns so that these vanes are aligned between points B and D, the distance between these points will be too small (in the absence of a modification of the housing) by approximately 4 mm for the vanes to pass by these points. This is due to the circumference between the inner wall of the housing 32 and the outer circumference 45 of the rotor and the fact that the rotor is offset. It is found that a 15" diameter interior housing with a 13" diameter rotor offset 1" requires that the distance between B and D be increased by approximately 4 mm. This is done by machining the area between points 82 and 83 and points 84 and 85. The machining is gradual, reaching its greatest depth of 2 mm at point B and point D. The point 85 is located 135 degrees from point 84 and point 83 is located 135 degrees from point 82.

Using another example, if one uses a 12" diameter rotor chamber with a 10¼" diameter rotor offset from the center of the housing by a distance of ⅞", the machining that will be necessary at points B and D is about 1½ mm. In summary by using the aforementioned examples and making a proportionate change in the amount of machining, one can determine the amount of machining necessary for any size of rotor, housing and offset.

Figure 8:
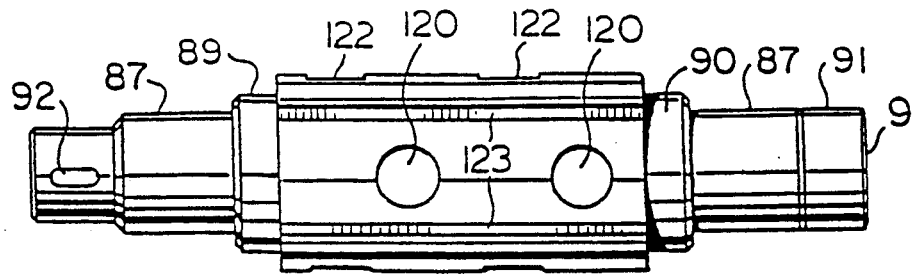
FIG. 8 is a side view of the main shaft of the engine.

FIG. 8 illustrates the center shaft for the rotor and illustrates two holes 120 for the rods 57 and two further holes 122 for the rods 74. The holes 120 and 122 extend at right angles to one another and are staggered along the central portion of the shaft. The front rotor cover 66 extends outwardly from portion 89 of the shaft while rear rotor cover 67 fits on and extends outwardly from portion 90. Bearing support surfaces 87 are located on the rearward and forwards ends of the shaft 9. At the very rear of the shaft, there is a fly wheel mount 91 while at the front end of the shaft an accessory mount 92 is located.

Figures 9, 10:
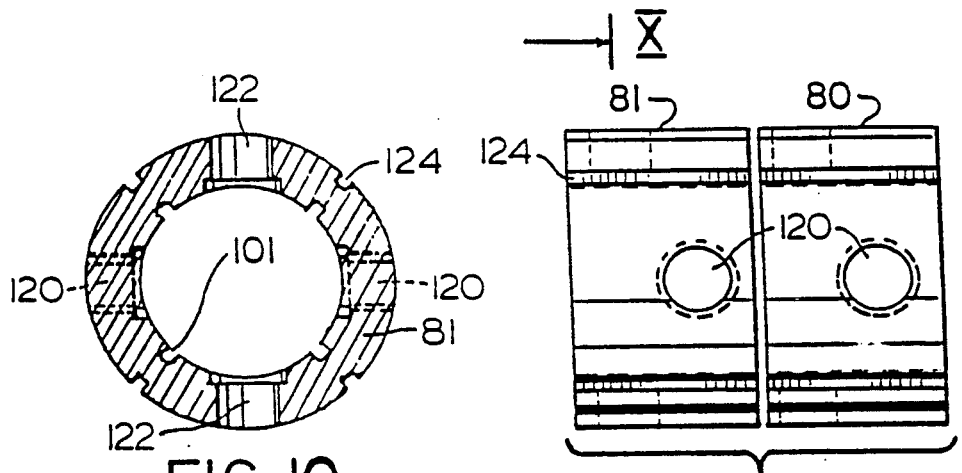
FIG. 9 is a side view of the two rings which support the vane rods.
FIG. 10 is a cross-section along line X—X of FIG. 9.

FIGS. 9 and 10 illustrate the construction of the two rings 80 and 81 that are arranged side by side on the shaft 9. The rings are adapted to move laterally apart from one another on the shaft to permit expansion of the vanes connected to the rods. This movement of the rings is permitted by key and keyway connections between the rings and shafts. Four keyways 101 formed on the inside surface of the rings are shown in FIG. 10. Keys of the usual construction fit in these keyways and in opposing keyways 123 formed along the shaft 9 to prevent rotation of the rings and the rods about the shaft 9. External keyways 124 are also formed about the circumference of both rings in order to fixedly connect the surrounding rotor sections to the rings.

Figure 11:
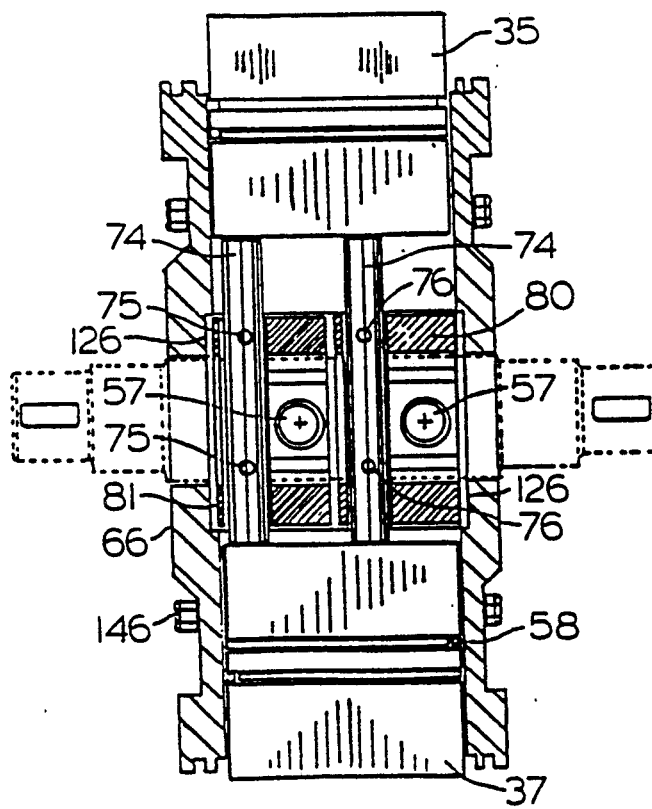
FIG. 11 is a cross-sectional view of the rotor showing a pair of vanes and the rods connecting same.

FIG. 11 shows two rods 74 fixedly connecting two vanes 35 and 37. Extending perpendicular to the rods 74 are two rods 57 that connect the remaining two vanes together. The two rings 80 and 81 through which the rods extend are mounted on the central portion of the shaft. As mentioned above cooling lubricant can enter the left connecting rod 74 through each of the openings 75 and it exits from the vanes and rods through the two holes 76 in the righthand rod 74. FIG. 11 illustrates also how the front and rear rotor covers can be provided with shallow circular recesses 126 to accommodate outward movement of the rings.

Figure 13:
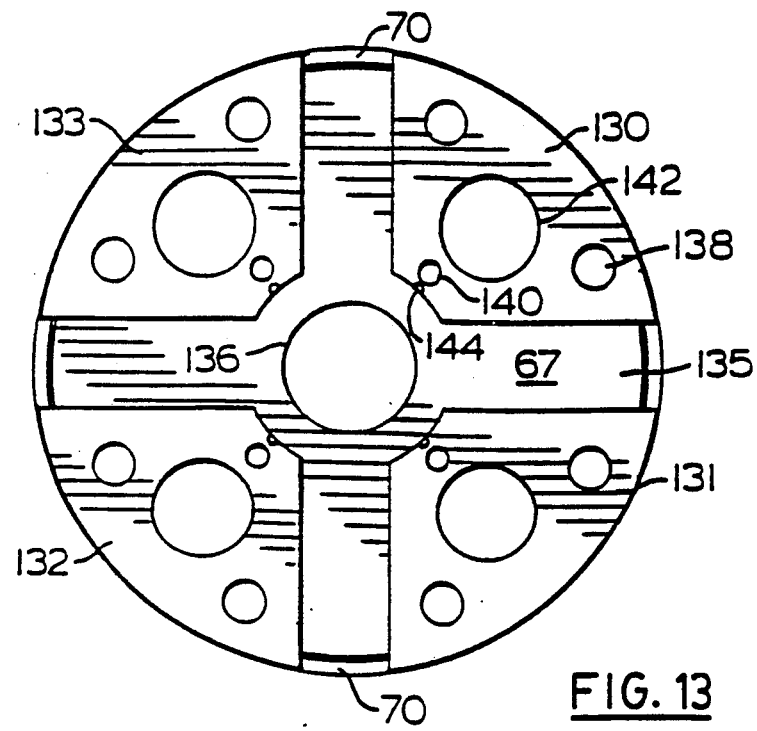
FIG. 13 is a side view of the rotor with a side cover removed in order to shown the quarter sections attached to the other rotor side cover.

FIG. 13 illustrates the internal structure of the rotor viewed from the front with the front rotor cover removed. The front and rear rotor covers are connected by bolts to four quarter sections 130 to 133. These quarter sections form four radially extending passageways 135 to accommodate the vanes and rods. The center of the rear cover 67 has a circular hole 136 for passage of the shaft. Bolt holes indicated at 138 and 140 are for the attachment of the front cover 66. Large central openings 142 are provided in the quarter sections for the circulation of cooling lubricant therethrough. This lubricant can be out flowing from the rotor. The seal 70 mounted about the circumference of the rear plate is also shown. Formed on the inside surface of each quarter section is a keyway 144. These are used to fixedly mount the quarter sections on the rings 80 and 81 using keys 146 shown in FIG. 7.

Figure 14:
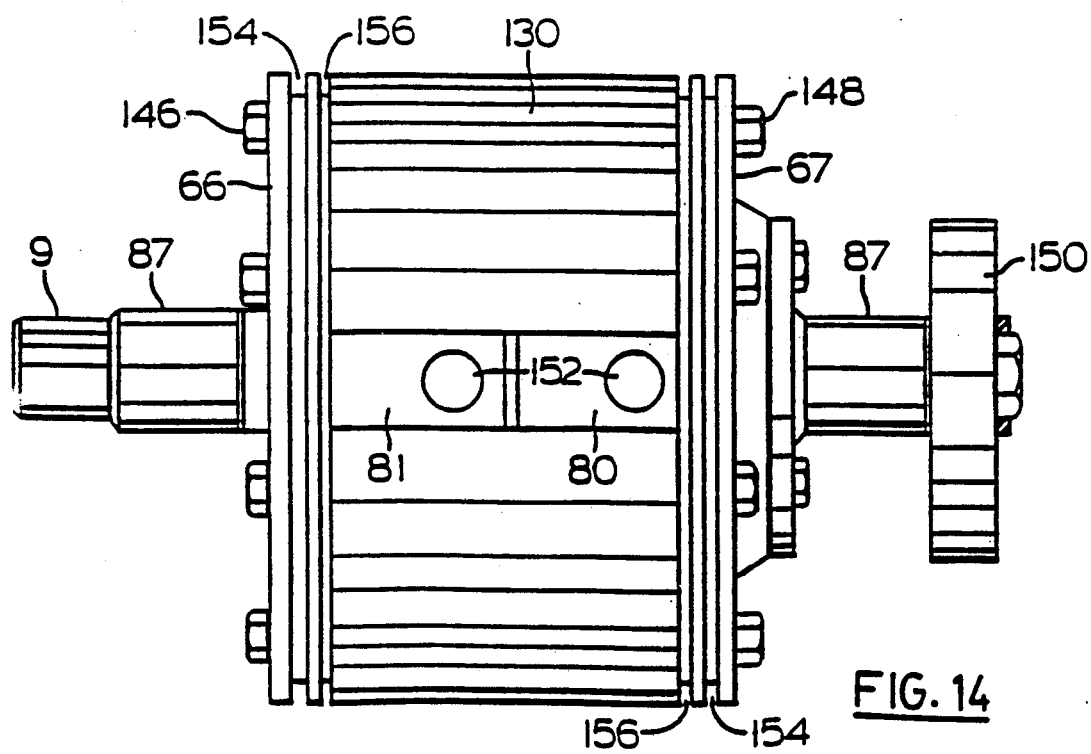
FIG. 14 is an axial view of a complete rotor for the engine with the vanes omitted.
Figure 15:
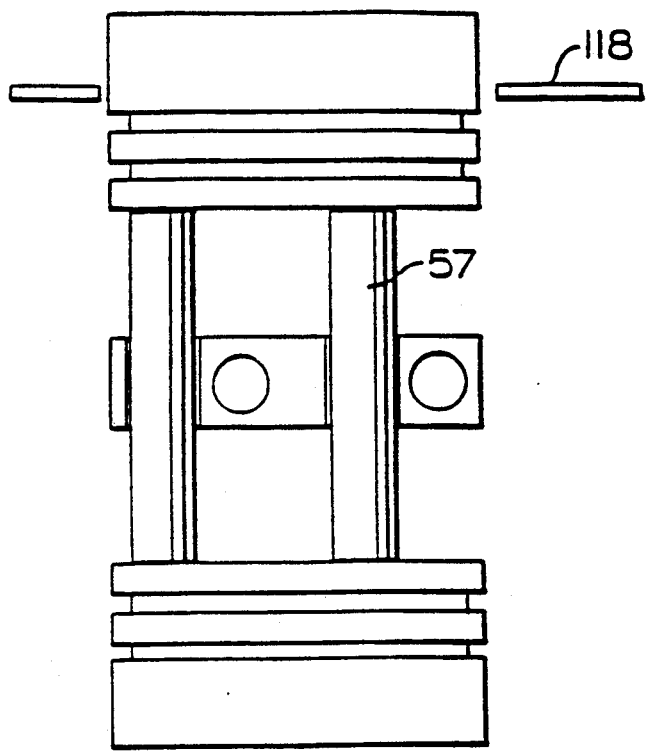
FIG. 15 is a detailed side view of a pair of vanes connected by two rods.

FIG. 14 illustrates one embodiment of a rotor mounted on the shaft 9. The front cover 66 is detachably connected to the quarter sections by means of bolts 146. The rear cover 67 is detachably connected to the quarter section by bolts 148. A coupling 150 is attached to the rear end of the main shaft. Also shown are two holes 152 in the rings 80 and 81 for the rods 57. Two circumferential grooves 154 and 156 extend around both the front and rear rotor covers in order to accommodate the circumferential seals. In a preferred embodiment each of these grooves accommodates two seals that are pushed apart by an annular wavy spring. These seals are made of steel in a known manner.

Figure 18:
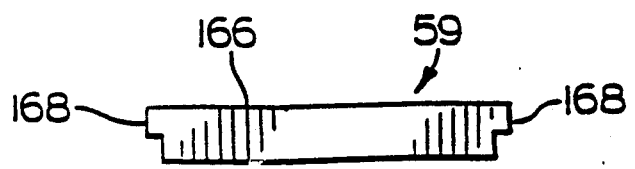
FIG. 18 is a side view of one apex seal for mounting in the outer end of the vane.

FIG. 18 of the drawings show an end view of a vane as viewed from a side of the rotor with its various seals removed therefrom to illustrate their construction. Extending around a bottom groove 158 are two L-shaped metal seals 160 which, when fitted together form an elongate rectangle. Extending along opposite sides of the vane in a central portion thereof are two straight metal seals 162. These seals fit snugly in two longitudinal grooves 164. Fitted into the top or outer end of the vane are two apex seals, the shape of which can best be seen from FIG. 18. These identical elongate seals have rounded outer ends at 166. Projecting from opposite ends of this seal are two extensions 168. Mounted on each short side of the vane are side seals 170 having a wide bottom section at 172 and a much narrower top section 174. An intermediate section 176 is wider than the top section and fits snugly in a central recess 178 formed in the side of the vane. The wide bottom section 172 of the seal is accommodated in transverse groove 180.

In constructing an engine in accordance with the present invention, the same metallic material should be used for both the housing and the rotor so that they will undergo the same thermal expansion when heated. Suitable materials for these parts include aluminum and cast iron.

It should further be noted that the front and rear side covers of the rotor do not act to guide the four vanes that slide in the rotor. The main purpose of these side covers is to seal the sides of the rotor including the provision of support for the circumferential seals.

It will be apparent and clear to those skilled in the construction of rotary engines that various modifications and changes can be made to the present invention without departing from the spirit and scope of this invention. Accordingly all such modifications and changes as fall within the scope of the appended claims are intended to be part of this invention.

What I claim as may invention is:

1. A rotary internal combustion engine comprising:
a housing defining a substantially circular rotor chamber therein, said chamber having a circumferential wall;
drive shaft means extending into said chamber;
a circular rotor in said chamber mounted on said drive shaft means to rotate therewith and having a diameter less than the diameter of said chamber, said rotor and drive shaft means being offset from the center axis of said chamber;
inlet means for introducing air and fuel into said chamber, said inlet means extending through said housing and opening into said chamber;
outlet means for exhaust gases extending through said housing and in fluid communication with said chamber;
at least two pairs of vanes slidingly mounted in said rotor, one vane of each pair being located diametrically opposite to the other vane of the pair;
means for fixedly connecting the vanes of each pair together so that a predetermined total distance between outer ends of said vanes of each pair remains constant and the same for each pair of vanes, said predetermined distance being substantially equal to the distance from a specific point on said circumferential wall of the chamber which is closest to the circumferential periphery of the rotor and a second point on the wall of said chamber diametrically opposite said specific point;
two separate rings having radial bores being slidably mounted on said drive shaft means;
said connecting means comprising two rods extending between the vanes of each pair and being slidable in radial bores in said drive shaft means and said rings, said rings permitting thermal expansion and contraction of said vanes;
wherein a portion of each of two circumferential wall sections is slightly removed from an initial, internal wall section that is cylindrical, to permit full rotation of said rotor and vanes in said chamber.

2. A rotary internal combustion engine as claimed in claim 1 wherein said outer ends of the vanes include two apex seals which are spaced apart sufficiently to traverse an ignition spark plug hole in said engine which is a gasoline engine.

3. A rotary internal combustion engine as claimed in claim 1 wherein pressurized air is introduced into the rotor chamber and enters an exhaust area thereby reducing the amount of waste gases in a section of said chamber wherein compression of a mixture of air and fuel takes place and aiding removal of exhaust gases and residue from said chamber.

4. A rotary internal combustion engine as claimed in claim 1 wherein front and back circular side plates are fixedly mounted on said rotor and annular seals extend about the circumference of each side plate.

5. A rotary internal combustion engine as claimed in claim 1 wherein said rods and rings are held in place by means of keys and keyways formed in said rings and said shaft means.

6. A rotary internal combustion engine according to claim 1 wherein the outer end of each vane in said rotor has sealing means mounted therein, said sealing means being biased outwardly by at least one spring.

7. A rotary internal combustion engine according to claim 1 wherein the outer end of each vane in said rotor has sealing means mounted therein, said sealing means being biased outwardly by at least one spring.

8. A rotary internal combustion engine according to claim 1 including means for circulating a cooling and lubricating oil through said rotor and vanes.

9. A rotary internal combustion engine according to claim 8 wherein said connecting means comprise two rods extending between each pair of vanes and said circulating means include longitudinal passageways extending through all of the rods which circulate said oil through the rods and said vanes.

10. A rotary internal combustion engine according to claim 1 wherein said inlet means include at least two openings for the passage of air under pressure located in opposite sidewalls of said housing.

11. A rotary internal combustion engine according to claim 1 including radially movable pistons mounted in said rotor with each of said pistons being located respectively between adjacent vanes and a gear arrangement for retracting and extending all of said pistons as the rotor rotates, said pistons operating to reduce engine roughness resulting from an ignition cycle of the engine.

12. A rotary internal combustion engine according to claim 1 wherein each of said two circumferential wall sections with a portion of the wall removed extends through an arc of about 135 degrees.

13. A rotary internal combustion engine according to claim 1 wherein the maximum amount removed from each of said two wall sections does not exceed 2 mm in depth of material removed and said maximum amount is removed in a central region of each wall section, said region being central in relation to the circumferential length of the respective wall section.

14. A rotary internal combustion engine according to claim 1 wherein said rotor includes centrally located sections forming radial passageways for said vanes and front and rear circular side cover detachably connected to said centrally located sections.

15. A rotary internal combustion engine according to claim 14 wherein circumferential seals extend about the periphery of both said front and rear side covers and act to seal opposite sides of the rotor in said housing.

16. A rotary internal combustion engine according to claim 1 wherein said rotor includes centrally located sections forming radial passageways for said vanes and front and rear circular side cover detachably connected to said centrally located sections.

17. A rotary internal combustion engine according to claim 16 wherein circumferential seals extend about the periphery of both said front and rear side covers and act to seal opposite sides of the rotor in said housing.

* * * * *